(12) United States Patent
Maglieri et al.

(10) Patent No.: US 10,452,770 B2
(45) Date of Patent: Oct. 22, 2019

(54) SYSTEM FOR TRACKING COMMENTS DURING DOCUMENT COLLABORATION

(71) Applicant: ORACLE INTERNATIONAL CORPORATION, Redwood Shores, CA (US)

(72) Inventors: Vittorio Maglieri, Ridgefield, CT (US); Charles Lattimer, Danbury, CT (US); Rajesh Mohanty, Bangalore (IN); David Battaglia, Sandy Hook, CT (US); Praneeth Srikanti, Hyderabad (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 999 days.

(21) Appl. No.: 14/860,471

(22) Filed: Sep. 21, 2015

(65) Prior Publication Data

US 2016/0092422 A1    Mar. 31, 2016

Related U.S. Application Data

(60) Provisional application No. 62/055,881, filed on Sep. 26, 2014.

(51) Int. Cl.
*G06F 3/00* (2006.01)
*G06F 17/24* (2006.01)
*G06Q 10/10* (2012.01)

(52) U.S. Cl.
CPC ........... *G06F 17/241* (2013.01); *G06Q 10/10* (2013.01); *G06Q 10/101* (2013.01)

(58) Field of Classification Search
CPC ...... G06F 3/0484; G06F 17/24; G06F 17/241; G06F 16/24578; G06F 16/313; G06F 16/93; G06F 17/242; G06F 16/2272; G06F 16/248; G06F 16/258; G06F 16/31; G06F 16/334; G06F 16/338; G06F 16/951; G06F 16/9537; G06F 17/2288; G06F 21/00; G06F 21/57; G06F 3/04817; G06F 3/04842;

(Continued)

(56) References Cited

U.S. PATENT DOCUMENTS 9,275,368 B1 * 3/2016 Harpalani ............. G06F 17/241
9,880,989 B1 * 1/2018 Cadabam ............. G06F 17/241

(Continued)

OTHER PUBLICATIONS

Myers, Eugene W., "An O(ND) Difference Algorithm and Its Variations", Dept. Computer Science, University of Arizona, Tucson.

*Primary Examiner* — Di Xiao
(74) *Attorney, Agent, or Firm* — Miller Nash Graham & Dunn LLP

(57) ABSTRACT

A computer-implemented method of online collaboration on a document includes converting a source document from a document generation format to an independent file format, generating a coordinate map for displayed elements of the source document, displaying text of the document to a commenting user in the independent file format, allowing the commenting user to select and comment on the text, matching the displayed text and the comments with the source document using the coordinate map to generate a difference map, and storing the comments and the difference maps external from the source document.

9 Claims, 5 Drawing Sheets

(58) Field of Classification Search
CPC .... G06F 16/13; G06F 16/1844; G06F 16/188;
G06F 16/35; G06F 16/355; G06F 16/36;
G06F 16/38; G06F 16/835; G06F 16/907;
G06F 16/94; G06F 17/2211; G06F
17/2235; G06F 17/277; G06F 17/2785;
G06F 9/4856; G06F 9/5072; G06F
12/0246; G06F 16/90335; G06F 16/9558;
G06F 16/958; G06F 2212/7205; G06F
2212/7207; G06F 8/36; G06F 8/65; G06F
8/73
See application file for complete search history.

(56) References Cited

U.S. PATENT DOCUMENTS

| | | | | |
|---|---|---|---|---|
| 2006/0259524 | A1* | 11/2006 | Horton | G06F 17/2288 |
| 2007/0011606 | A1* | 1/2007 | Bagheri | G06F 17/243 |
| | | | | 715/233 |
| 2007/0300168 | A1* | 12/2007 | Bosma | G06F 3/1205 |
| | | | | 715/820 |
| 2010/0235763 | A1* | 9/2010 | Massand | G06F 17/2229 |
| | | | | 715/753 |
| 2010/0278453 | A1* | 11/2010 | King | G06Q 10/10 |
| | | | | 382/321 |
| 2014/0033068 | A1* | 1/2014 | Gupta | G06Q 10/103 |
| | | | | 715/751 |
| 2017/0286416 | A1* | 10/2017 | Gan | G06F 3/0482 |

* cited by examiner

FIG. 4

| Report Center [Under Review] | | | |
|---|---|---|---|
| Author 12/15/2015 | Review 12/27/2015 | Sign Off 12/31/2015 | |
| Completed | 30% ▮▯ 6 Days left | Not Started 10 Days left | |

| Name | Comments | Reviewers | |
|---|---|---|---|
| Report | | ◯ User 4 | ◯ User 5  Review 01 ▽ |
| Table of Contents | | | |
| PART I. FINANCIAL INFORMATION | | ◯ User 6 | ◯ User 7 |
| 1.0 – FINANCIAL STATEMENTS ( | | ◯ User 8 | |
| 1.1 – CONDENSED CONSOLID | | | |

| | Comment | User | Status | Last Modified | Most Discussed |
|---|---|---|---|---|---|
| ☐ | Comment 1 | User 1 | Live | 1/4/2016 6:21:53 PM | |
| ✓ | Comment 2 | User 1 | Live | 1/4/2016 6:22:07 PM | |

Comments

User 1: Does the quick brown fox really jump?

DOCUMENT 1

📌 The quick brown fox jumps over the lazy dog. The cow jumped over the moon and the dish ran away with the spoon. Farmer McDonald quickly realized his farm was spiraling out of control.

FIG. 5

SYSTEM FOR TRACKING COMMENTS DURING DOCUMENT COLLABORATION

RELATED APPLICATIONS

This application claims priority to U.S. Provisional Application No. 62/055,881, which is incorporated by reference here in its entirety.

BACKGROUND

Document viewers allow online viewing of documents in browser windows. High fidelity document rendering displays the document in the same view as if it were printed, and so is sometimes referred to print view. When comments are attributed to such a view, the comments may not have any relation to the corresponding document text, as the on screen anchors and comments typically are painted over the document. When the source document changes, the comment anchors may become invalid. For example, if an editing user makes changes to the text in a MS-Word document and attaches a comment, when the original user accepts the comments the text to which the document is attached goes away but the comment remains.

An alternative approach inserts the comments locations in-line with the text itself in the source document. As text moves from revision to revision, the comment moves along with it. However, embedding the information within the document can present problems around offline document editing, such as editing and commenting on the desktop, security document conversion and concurrent editing and review.

Another approach has attempted to solve this problem using an HTML view of the document. This allows for in-lining the comment locations in the text and provides some facility for tracking comments between revisions. However, an HTML rendering is not a high fidelity rendering and the comments are lost when the document is taken offline.

BRIEF DESCRIPTION OF THE DRAWINGS

FIG. 4 shows an example of the user interface at the reviewing stage of the document.

FIG. 5 shows an example of a document viewer with associated comments.

DETAILED DESCRIPTION OF THE EMBODIMENTS

Figure 1:
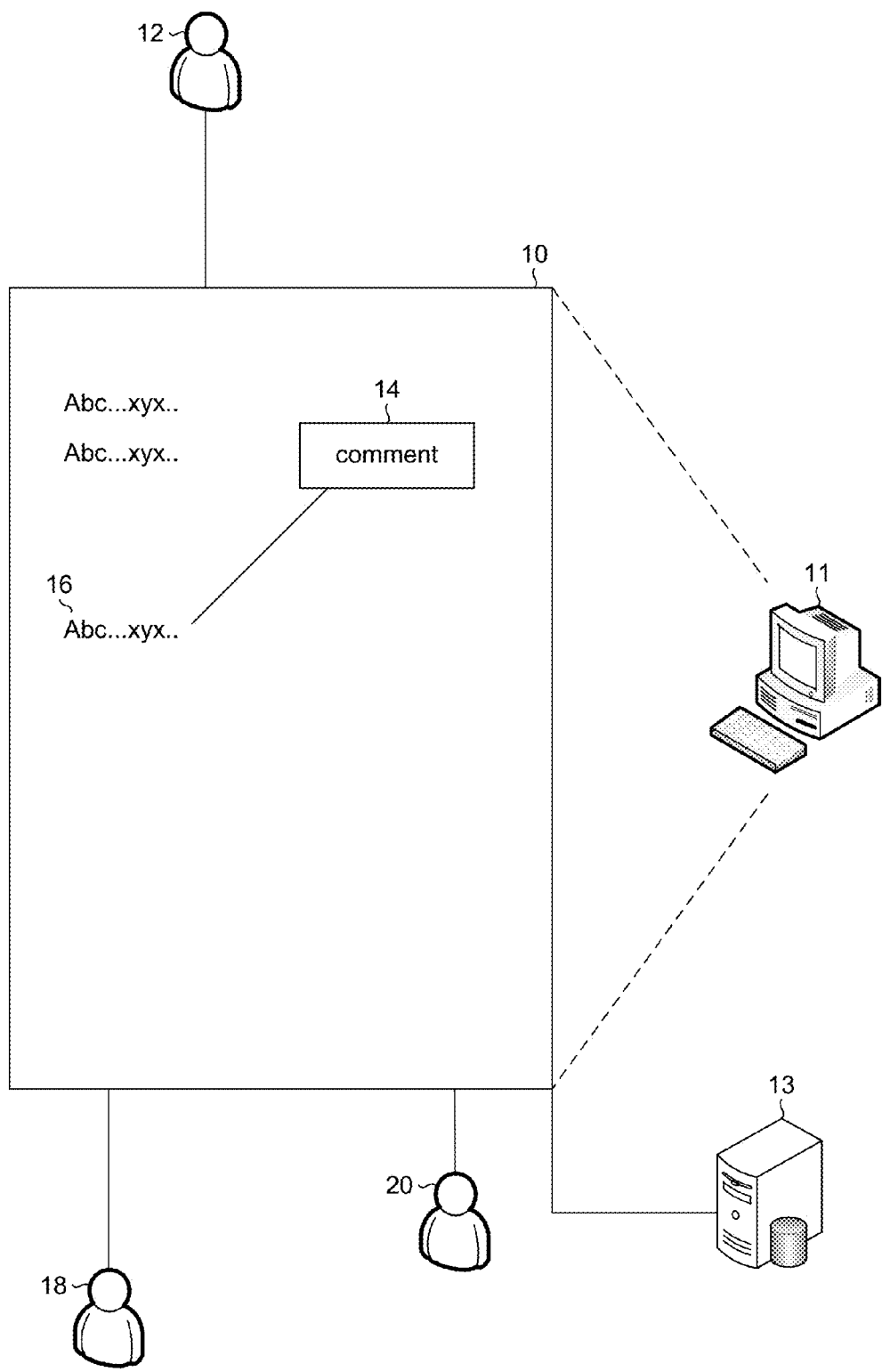
FIG. 1 shows a diagram of an embodiment of a system for online document collaboration.

FIG. 1 shows a collaboration system for online document review. An originating user such as 12 generates a document 10 using some sort of document generation software, such as Microsoft® Word®, Excel®, etc. The originating user may or may not be an author, in that the originating user may not actually create the content used in the document. The originating user, as used here, initiates the process of creation, review and sign off of a document referred to as a report or report package. The document may include one or more documents generated from one or more document generating software programs such as the MS Office® suite, etc.

In generating the source document, the originating user may perform several tasks. The originating user will name the document, determine the components to be included in the document such as word processing files, spreadsheets, images, etc. The originating user may divide the document up into smaller portions, referred to here as doclets. The doclets may be organized into sections. The originating user may also assign authors to the individual doclets and/or sections.

Figure 2:
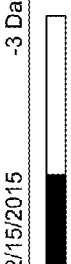
FIG. 2 shows a user interface provided to an originating user.

FIG. 2 shows an example of a user interface 22 presented to the user as part of the collaboration system. The user interface has a left pane 22 that is used to track the components of the document. There is a tracking pane 26 at the top that allows users to see at what stage the document is in its cycle. Portion 28 lists the authors and parties responsible for the various parts of the document, as well as the approvers/commenting users.

Returning to FIG. 1, many users will be contributing to the document, so the user saves the document 10 to a location that other users can access to allow them to collaborate on the document and in a form that allows the comments to remain associated with the proper portion of the text regardless of the viewer used, the browser used, etc. The document and its associated information may be saved to a database or database server, or other centralized file location such as 13.

In some embodiments, the originating user may initiate the process on a first computer 11 that has an interface to allow the originating user to define the document and its portions, as well as designate authors, reviewers and people who must sign off on the completed document. The various parties may receive notification of their involvement and/or tasking relative to the document through an e-mail system or other notification system. These people may all use different types of computers, operating systems and browsers to generate their portions or the document, or access the documents for review and sign off.

In the scenarios discussed here, the examples will involve using a browser such as Internet Explorer®, Firefox®, Safari® or Chrome® to view documents. Different browser versions may use different viewers and the settings in the viewers may change the format of the text and the locations of the texts.

For example, commenting user 18 makes comments such as 14 on the text 16. Another user 20 may make other comments on the document. In prior systems, the comments may become muddled as the text expands to move to a different page, or is deleted to contract the text to a different page. Comments associated with text that is ultimately deleted will lose their anchors and the information in them may not make any sense, even though the comments may have valuable information in them that relate to the entire document.

Figure 3:
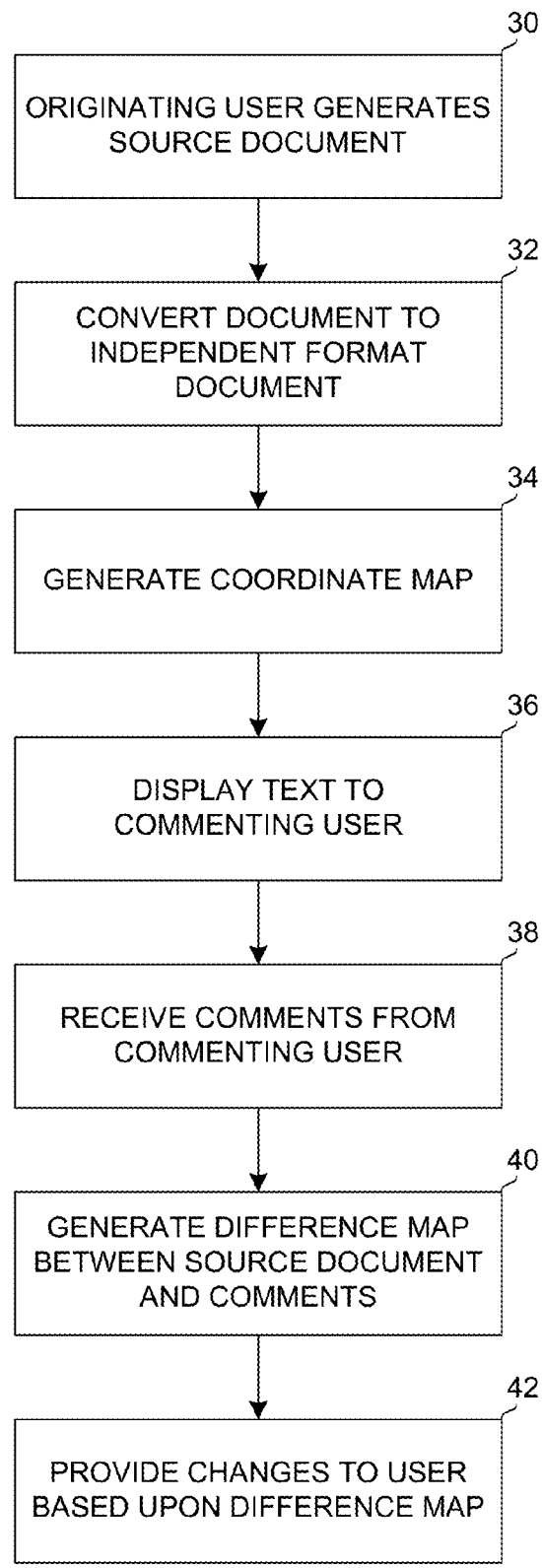
FIG. 3 shows a flowchart for a method of converting the document from its original source document.

FIG. 3 shows an embodiment of a process of collaboratively working on a document. The originating user generates a document at 30. The user or designated authors will typically use a document generation software such as MS-WORD®. Other packages such as text editors, presentation packages, spreadsheet programs, etc. are all well within the scope of the embodiments discussed here, as a document that results from a combination of items from these programs, such as a text document with embedded spreadsheets, images and text. To assist in understanding of the embodiments here, specific examples of MS-WORD® (Word) and Portable Document Format (PDF®) used in a Java® environment.

Some terms used here may be interpreted in different ways. Users may comment on documents in their browser windows and this may be referred to as working on it 'online.' A document viewer may be a piece of software that is an add-on to a browser or just the browser itself.

In the embodiments here, the document generation software is Word® and the browsers run in a Java® environment in which there are no application programming interfaces (APIs) for Microsoft products. In addition, as discussed above, the in line revisions and commenting within packages such as Word are not optimal for tracking the comments with true connections to the text.

In the process here, the document is converted into an independent file format at 32. The conversion in some embodiments require the use of a package that overcomes the issues with having no APIs for Word in a Java environment. One example is 'Aspose Words' a Java word processing component that enables developers to generate, modify, convert and render Word documents. However it is performed, the result is a document in PDF format, although any independent file format may be used.

FIG. 4 shows the user interface 22 at this stage. As can be seen in FIG. 4, the tracking pane 26 now shows the document in review. The portion 28 that lists the various people involved now only includes the reviewers. In the sign off stage, not shown here, the tracking pane 26 would show that the review section is completed and the only parties listed in 28 would be those responsible for signing off on the document.

Returning to FIG. 3, after document is converted, the process generates a coordinate map of the document in a character-by-character fashion on a pixel basis. In one embodiment, PDFBox is used to generate the coordinate map. The map represents the page offsets for each of the elements on the page. The text is then displayed for a commenting user to view. The commenting user selects the desired text upon which to comment and the coordinates in the coordinate map of the selection are captured at 38. The coordinates of the selection are used to determine the actual text via the coordinate map previously generated.

FIG. 5 shows an example of a document viewer with the associated comments. The viewer 50 has a document window 52 that displays the text, images, spreadsheets, etc. of the document or portion of the document. The comment section 54 shows the comments that correspond to the anchor points such as 58. The banner 56 shows comments that are no longer attached to text, but still have relevant information in them.

Once the selected text is identified, the rendered text needs to be matched up with the source document. Since there may be differences between the rendered versions of the document content, such as in the white spaces, fonts, alignment, etc., the rendered content needs to match the source content.

In one embodiment, the process uses an enhanced implementation of Eugene Meyer's Longest Common Subsequence (LCS) to scan the rendered document content and the source document content to generate a difference map at 40. The difference map is used to locate the selected text to which the comment is anchored. LCS is used to compare two documents, such as PDF v. Word or Word v. Word, as examples. LCS matches up text locations between the two documents. LCS typically performs a character by character recognition. In the embodiments here, it has been extended to be able to recognize words in a word wise subsequence algorithm.

The LCS is not used for coordinate mapping. The coordinate mapping is used for understanding where the text is rendered on the screen to the user. The coordinate map is not applied to the source document. The difference map is applied to the source document and anchors the text to the words in the source document. This may be easier to understand in the context of an example, with the understanding that the example is in no way intended to limit the scope of the claims.

The LCS compares the PDF that was rendered to the source Word document to identify where to anchor the comments in the source. The commenting user's comments are relative to the displayed document in the independent file format, in this example, PDF. Based upon the coordinate map, the process knows where the comments belong in the PDF. LCS helps to match that PDF text location to the source document.

One should note that the anchoring of the comment is done by a comparison of the PDF to the Word version from which the PDF was generated, the same version of the document. In more general terms, the rendered document is compared to the document, or portion of the document, in the document creation format. When a revision comes in for the originally generated, in this case Word, version, such as when the originating user compiles all of the changes into a revision, the process compares the two Word documents (original and revision) to place the anchors relative to the revision.

The location of the text and its associated comment is stored external to the document, externalizing the commentary. When the originating user or author receives the comments as changes at 42, that person can view the comments matched up with the text to provide a revised document. The revised document is then sent out to either the same commenting users or a new set of commenting users.

As mentioned above, in one scenario an originating user generates a document that may be very large and have several different components. The originating user may divide the document up into pieces, referred to here as doclets, with each doclet having its own author, commenting user or users. Each commenting user may view the document in a viewer, download it into Word, etc. If the user downloads it into Word, the commenting process will be implemented such that the user will not be able to make inline edits as would normally happen in Word.

Once the comments are made to each doclet, the document is then recombined and the originating user or doclet author makes the changes. The originating user may then send the revised document out to the same reviewers, or possibly to another level of reviewers. The revision will show all of the previous comments connected to the appropriate text. If the text has been deleted, the comments associated with text will appear on the document, such as in a top banner. The process may then repeat again and again until the document is finalized. Once the document is finalized, the user interface of FIG. 3 would then allow the originating user to notify the people who need to sign off of the document's readiness.

In this manner, a document may be collaborated upon by several different users viewing it in several different possible formats, where the comments are attached the correct text and preserved across revisions and versions until the final document is created. In other embodiments, the process is optimized for memory consumption and performance.

Although there has been described to this point a particular embodiment of a method and system to monitor database performance, it is not intended that such specific references be considered as limitations upon the scope of this invention except in-so-far as set forth in the following claims.

What is claimed is:

1. A computer-implemented method of online collaboration on a document, comprising:

converting a source document from a document generation format to an independent file format;

generating a coordinate map for displayed elements of the source document in the independent file format;

displaying text of the document to a commenting user as displayed text in the independent file format;

allowing the commenting user to select and provide comments on the displayed text in the independent file format;

using the coordinate map to locate the comments on the displayed text;

generating a difference map by comparing the displayed text in the independent file format to source text in the source document;

anchoring the comments to the text in the source document using the difference map;

storing the comments and the difference maps external from the source document;

receiving a revision for the source document, and implementing the revision, wherein implementing the revision includes deleting text from the source documented as indicated by the revision, and moving any comments anchored to deleted text to a banner associated with the document such that the comments anchored to deleted text are displayed in the banner when the source document is displayed.

2. The computer-implemented method of claim 1, further comprising providing the originating user the ability to generate the source document.

3. The computer-implemented method of claim 2, further comprising allowing the originating user to divide up the source document into sections, and the sections into doclets.

4. The computer-implemented method of claim 3, further comprising allowing the originating user to assign authors to at least one of the sections and the doclets.

5. The computer-implemented method of claim 2, wherein providing the user the ability generate the source document comprises providing the originating user a user interface through which the originating user can identify authors and commenting users for the source document.

6. The computer-implemented method of claim 1, wherein generating the coordinate map comprises generating a character-by-character map on a pixel basis.

7. The computer-implemented method of claim 1, wherein matching the displayed text and the comments with the source document using the coordinate map to generate a difference map comprises generating a difference map comprises using a longest common sequence to scan rendered content and content of the source document.

8. The computer-implemented method of claim 1, wherein generating a difference map using a longest comment sequence comprises using an extended longest common sequence in a word wise subsequence manner.

9. A system, comprising:

a first computer having a display screen, a processor, and a user input device, the processor configured to execute instructions to:

display a user interface on the display screen;

receive inputs from an originating user, the inputs identifying a source document, the inputs including identifying any portions of the source document, identification of authors of different portions of the document and commenting users for each portion;

provide the user with an ability to create at least a portion of the source document;

generating a coordinate map of the source document;

access a memory to allow storage of the source document, identification of authors for each portion, and commenting users for each portion; and receive a revision for the source document, and implement the revision, wherein implementing the revision includes deleting text from the source documented as indicated by the revision, and moving any comments anchored to deleted text to a banner associated with the document such that the comments anchored to deleted text are displayed in the banner when the source document is displayed;

at least a second computer having a display screen, a processor and a user input device, the processor configured to execute instructions to:

access the memory to retrieve the source document and the coordinate map;

provide at least one commenting user a view of at least a portion of the source document;

receive at least one comment from the commenting user associated with text in the portion of the source document;

generate a difference map by comparing the displayed text in the independent file format to source text in the source document;

anchoring the comment to the text in the source document using the difference map; and storing the source document and the difference map external from the source document.

* * * * *

UNITED STATES PATENT AND TRADEMARK OFFICE
CERTIFICATE OF CORRECTION

PATENT NO. : 10,452,770 B2
APPLICATION NO. : 14/860471
DATED : October 22, 2019
INVENTOR(S) : Maglieri et al.

Page 1 of 1

It is certified that error appears in the above-identified patent and that said Letters Patent is hereby corrected as shown below:

In the Drawings

On sheet 2 of 5, in FIG. 2, Line 9, delete "STATEMENTS (" and insert -- STATEMENTS --, therefor.

On sheet 2 of 5, in FIG. 2, Line 12, after "Discussion" delete "an".

On sheet 4 of 5, in FIG. 4, Line 1, delete "Revie]" and insert -- Review] --, therefor.

On sheet 4 of 5, in FIG. 4, Line 9, delete "STATEMENTS (" and insert -- STATEMENTS --, therefor.

In the Claims

In Column 5, Line 47, in Claim 5, after "ability" insert -- to --.

Signed and Sealed this
Twenty-third Day of February, 2021

Drew Hirshfeld
*Performing the Functions and Duties of the
Under Secretary of Commerce for Intellectual Property and
Director of the United States Patent and Trademark Office*